April 9, 1935. H. A. DOUGLAS Re. 19,519

REFLECTING ELECTRIC LAMP

Original Filed Feb. 3, 1930 2 Sheets-Sheet 1

HARRY A. DOUGLAS
INVENTOR
BY Freeman and Weidman
ATTORNEYS

April 9, 1935. H. A. DOUGLAS Re. 19,519

REFLECTING ELECTRIC LAMP

Original Filed Feb. 3, 1930 2 Sheets-Sheet 2

HARRY A. DOUGLAS
INVENTOR
BY Freeman and Weidman
ATTORNEYS

Reissued Apr. 9, 1935

Re. 19,519

UNITED STATES PATENT OFFICE 19,519

REFLECTING ELECTRIC LAMP

Harry A. Douglas, Bronson, Mich.

Original No. 1,911,610, dated May 30, 1933, Serial No. 425,542, February 3, 1930. Application for reissue March 17, 1934, Serial No. 716,205

24 Claims. (Cl. 173—339)

My invention relates to structures employing incandescent electric lamps and is particularly serviceable in connection with concave reflectors, though there are features of my invention whose use is not to be thus limited. In lamp structures employing concave reflectors it has been the practice to mount incandescent lamps upon and within such reflectors through the intermediation of lamp holding sockets which are carried by the reflectors and extend therethrough. These sockets carry circuit terminal contacts which are spring pressed against lamp contacts carried upon the rear faces of the lamp bases, whereby the lamps are included in circuit and are held in direct assembly with their sockets. In structures now in use, the spring pressed contacts in the sockets press bayonet pins or other projections against bayonet seats in the sockets, the reflectors merely serving as carriers for the sockets and taking no part in receiving the spring pressure which enables the lamps to be assembled with the reflectors.

The principal object of my invention is to provide a new and improved means for enabling the assembly of an incandescent electric lamp with a reflector. Another object is to provide new and improved means for positioning, and for holding in position, with a reflector, an incandescent electric lamp.

A further object is the provision of a construction in which the reflector, itself, is employed to receive the pressure that enables the assembly of the lamp and reflector, an arrangement which permits of direct assembly of the lamp and reflector.

Another object is the simplification of a structure for carrying a resilient means, specifically a contact means.

Other objects will appear hereinafter as the description of the invention proceeds.

The novel features of the invention will appear from this specification and the accompanying drawings forming a part thereof and disclosing one embodiment of the invention, and all these novel features are intended to be pointed out in the claims.

In the drawings Fig. 1 is a view, on a large scale illustrating one embodiment of my invention, the incandescent lamp being shown in elevation, while a socket means, assembled therewith, and a fragmentary portion of a concave reflector, are shown in section;

Fig. 5 is a view generally similar to Fig. 3, but taken at right angles to the direction in which Fig. 3 is taken;

Figure 1:
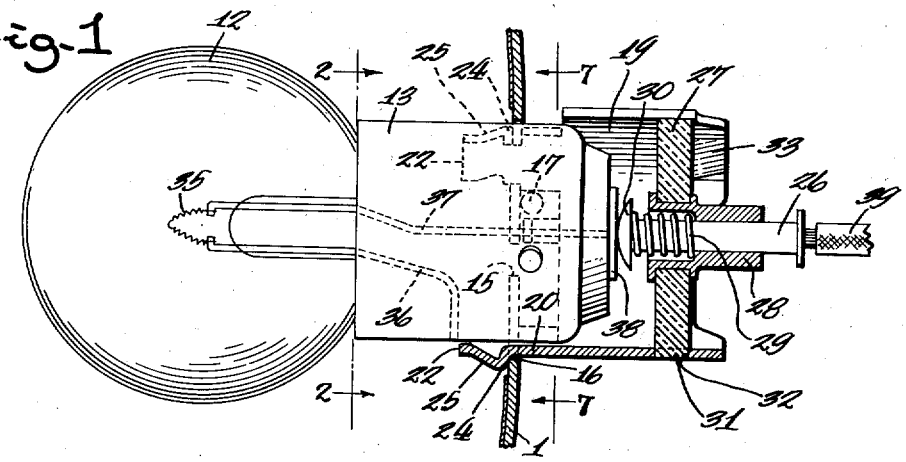

The head lamp illustrated is inclusive of a reflector 1, here shown as parabolic, whose concave reflecting face is covered by a light transmitting closure 2, which may be of glass. This closure is held against the front of the reflector by an assembling ring 3 which also serves to assemble the reflector with a concave lamp back 4. The construction of the peripheral rim portion of the reflector enabling the assembly of the reflector with the lamp back and the construction of the parts 3 and 4 may be of any well known or suitable character and form no novel parts in my present invention on which account further description of these parts need not be given. I have illustrated an incandescent lamp on the axis of the parabolic reflector which is assembled with the reflector in accordance with the prior art. The lamp bulb 5 and the filament therein are provided with a base 6 having bayonet pins 7 which are inserted within bayonet slots 8 formed in the forward end of the lamp socket 9. This lamp socket is passed through an opening formed in the crown of the reflector and is assembled therewith by means of the beads 10 which are formed upon the socket and tightly receive the annular portion of the reflector which margins the aforesaid opening therein. A circuit conductor 11 extends to a spring pressed circuit terminal, not shown, carried within the rear of the socket and pressing against a corresponding contact upon the lamp base whereby the bayonet pins 7 are pressed against the seats of the bayonet slots 8 to hold the lamp in direct assembly with the socket. In my copending application Serial No. 425,543 filed February 3, 1930 I have illustrated an embodiment of my present invention, whereby an incandescent lamp employed in the general location of the lamp 5 may be most accurately positioned to bring the lighting center of its filament into coincidence with the focus of the parabolic reflector.

The form of the invention herein shown may be employed where the incandescent lamp is located upon one side of the reflector axis, but the claims herein are not to be limited to this arrangement, since other positions and other types of reflectors may be employed.

In the embodiment of the invention herein shown, an incandescent electric lamp 12 has a generally cylindrical base 13. The reflector 1 has a primary circular opening 14 of substantially the diameter of the base 13, which may surround the base in close proximity therewith. The reflector also is provided with a plurality of auxiliary openings 15, 16, the purpose of which will appear. The auxiliary openings 15, 16 are in this case formed by locally radially extending the primary opening 14.

The lamp 12 is positioned and held in position with the reflector by means associated with the lamp and with the reflector. In this case the positioning means proper is associated with the base 13, which is laterally extended. The lateral extensions may take the form of a plurality of projections or pins 17, here shown as two in number and diametrically opposed. The holding means in this instance includes a cage-like means 18.

The cage-like means 18 includes a shell portion 19 with which are associated axially extending peripherally spaced portions, in the form of bars or tongues 20, in this embodiment integral with the shell portion 19. The shell portion 19 may be substantially cylindrical and longitudinally split, as at 21.

The bars or tongues 20, in this case three in number, are adapted to be carried by the reflector 1, by insertion through the respective auxiliary openings 16. The bars or tongues 20 may have their end portions 22 of reduced width, thereby forming shoulders 23, adapted to abut the reflector 1, the width across the shoulders being greater than the width of an opening 16.

The bars or tongues 20 may also be provided with radially outwardly extending shoulders 24, the approach to the shoulders on one side thereof being desirably in the form of inclined planes 25. The circle generally defining the radially outer parts of the shoulders 24 is of greater diameter than the circle generally defining the radially outer edges of the auxiliary openings 16. It follows, therefore, that in this instance the cage-like means 18 may be mounted with the reflector by inserting the bar ends 22 into the openings 16, the outer edges of the openings 16 and the inclined planes 25 acting to cam the bars radially inward until the shoulders 24 clear the outer edges of the openings 16 and snap out on the other side of the reflector. At this time the shoulders 23 abut the reflector. The bars 20, 22 and the shell portion 19 are desirably made of resilient material and will therefore tend to expand relatively radially to hold the cage-like means assembled with the reflector. The fact that the shell portion is split at 21 may be used to aid in that holding function.

Figure 7:
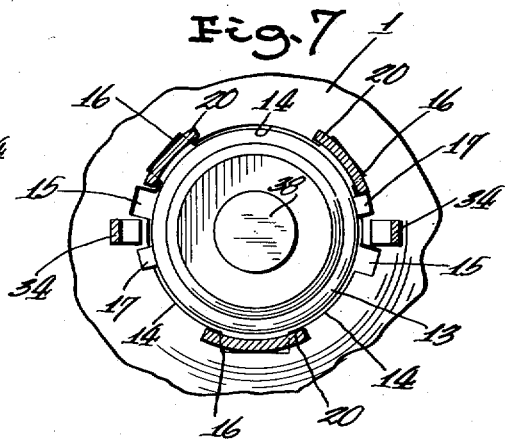
Fig. 7 is a sectional view on line 7—7 of Fig. 1, the incandescent lamp base being shown in elevation.

If desired the auxiliary openings 16 may be made of different peripheral width, and the width of the bar ends 22 complementary thereto. Thus the lowermost opening 16, as viewed in Figs. 7 and 8 may be made wider than the other openings 16, and the lowermost bar end 22 correspondingly wider. The cage-like means 18 can therefore be inserted into the reflector in but one peripheral position.

The means for holding the lamp 12 in position further includes resilient means which is mounted with the cage-like means 18. The resilient means may include a stem or rod 26, slidable in a member 27, a sleeve 28 being desirably interposed. The resilient means proper is shown as a helical spring 29 which surrounds the stem 26 and is interposed between the sleeve 28 and a head 30 on the stem 26. The sleeve may be provided with a socket for receiving the spring 29.

To mount the resilient means with the cage-like means 18, the member 27 may be disposed within the shell portion 19, and to hold the member 27 within the portion 19, it is provided with a plurality of radial projections 31 adapted to register with a plurality of recesses 32 which are desirably openings extending entirely through the shell portion 19. In order to enable the more convenient assembly of the member 27 and the shell portion 19, the latter may be flared at a plurality of places 33, in this instance two places, in longitudinal alinement with two of the recesses 32, whereby two of the projections 31 may be guided into the respective recesses 32, after the third projection 31 has been inserted in the remaining recess 32.

Figure 2:
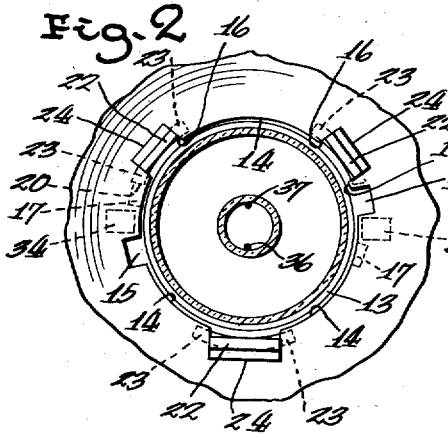
Fig. 2 is a sectional view on line 2—2 of Fig. 1.
Figure 3:
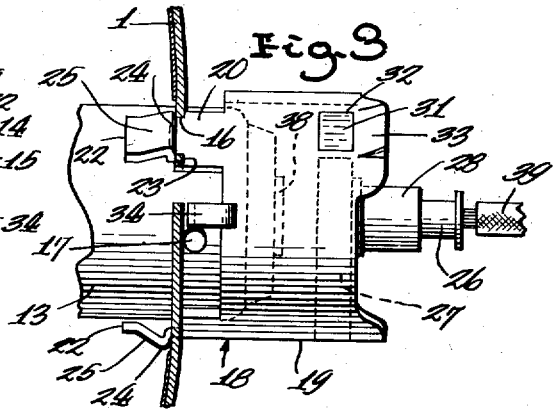
Fig. 3 is a view in elevation of a lamp base and socket means, a fragmentary portion of the reflector being shown in section.
Figure 4:
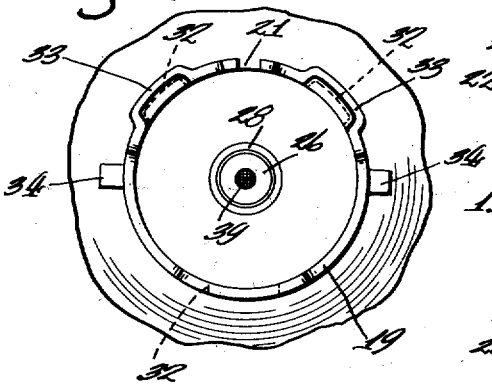
Fig. 4 is a rear view of the structure as it appears in Fig. 3 with a fragmentary portion of the reflector shown as surrounding the lamp base.
Figure 5:
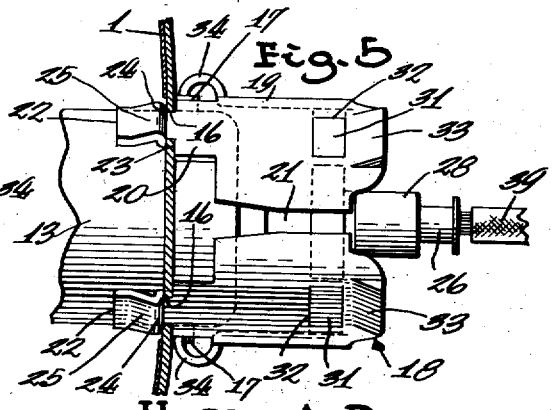
Figure 6:
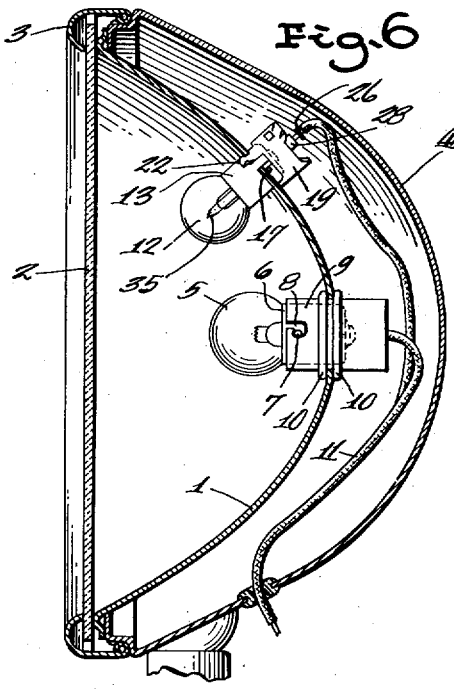
Fig. 6 is a sectional elevation of a complete automobile head lamp containing the embodiment of my invention shown in Fig. 1.
Figure 8:
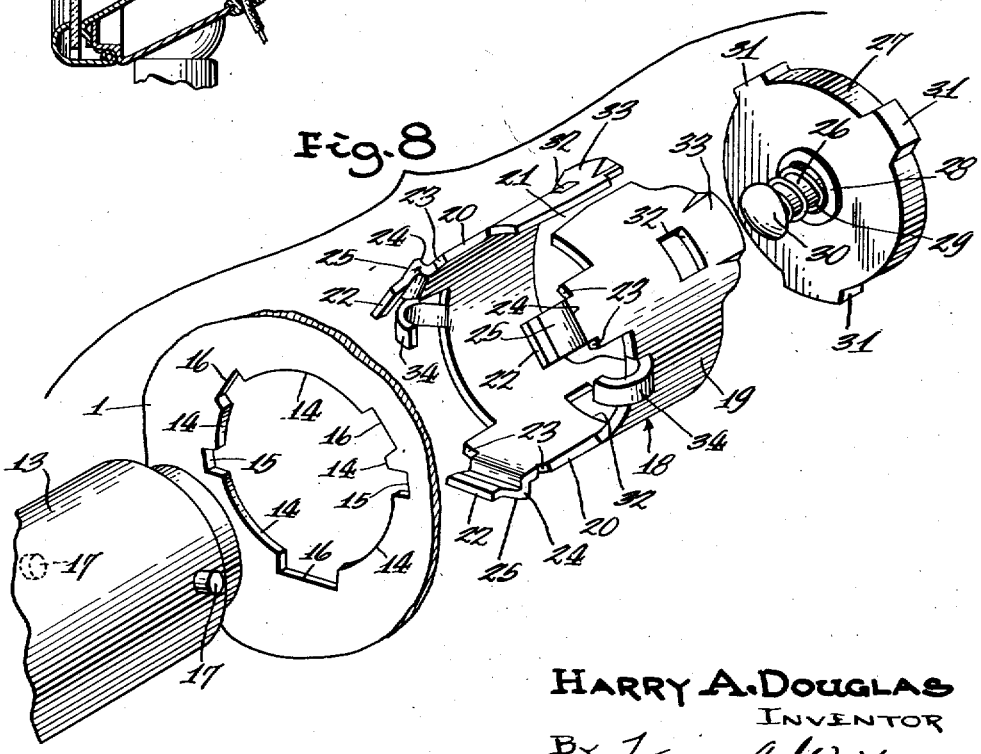
Fig. 8 is a perspective view showing a fragment of the incandescent lamp base, a fragment of the reflector, and the lamp socket means, disassembled.

The cage-like means 18 may further include a plurality of bars or tongues 34, here shown as two, diametrically opposed, extending in a generally axial direction, but in this instance, also arched radially outward as can be seen in Figs. 5 and 8. Longitudinal edges of the bars or tongues 34 are adapted to be in substantial alinement with respective radial edges of the auxiliary openings 15, as can be clearly seen in Figs. 2 and 3.

Assuming that the cage-like means 18 has been mounted with the reflector as hereinbefore described and as shown in Figs. 1 through 7, if it is desired to position a lamp 12 with the reflector 1, the lateral projections 17 on the lamp base are guided into the longitudinal slots formed by the reflector openings 15 and the respective adjacent bars or tongues 20, 34, against the bias of the resilient means 26, 29, acting against the base 13. When the projections 17 have been moved axially sufficiently to clear the ends of the bars or tongues 34, the lamp is rotated, bringing one of the projections 17 against one of the bars or tongues 20, as can be seen in the left hand part of Fig. 2. The lamp is then released, whereupon the resilient means 26, 29 causes the positioning means to register with the reflector, the projections 17 abutting the reflector 1. In the reverse direction rotative movement of the lamp is prevented by the bars or tongues 34 in cooperation with the projections 17.

It will be evident that the cage-like means 18 with its resilient means 26, 29 serves not only to press the positioning means proper of the lamp into registry with the reflector at a plurality of points spaced about the periphery of the lamp, to position the lamp directly from the reflector, but also serves, through the bars or tongues thereof, in cooperation with the lateral extensions on the lamp base, to restrain movement of the lamp about its axis.

It is further evident that the described construction is not only adapted to perform all of the functions of the usual socket means for incandescent electric lamps but that in this instance there is provided a slot-and-projection connection means which is jointly defined by the lamp base means, the reflector and the socket means. In its more specific aspects, the construction provides a bayonet slot or seat, or both, defined jointly by the reflector means and the socket means.

With the illustrated construction there need be no interruption in the uniform concavity of the reflecting face of the reflector, nor in the uniform convexity of the back thereof, the lamp being positioned directly from the reflector.

In the illustrated embodiment of the invention, the incandescent lamp 12 is a so-called single pole lamp whose filament 35 has one terminal connected by a conductor 36 with a metallic sheath that surrounds and forms part of the lamp base 13. The other terminal of the filament 35 is connected by a conductor 37 with a lamp contact 38 provided on the end of the lamp base, and in this case, upon the lamp axis. In this construction the head 30 of the stem 28, with which the contact 38 is adapted to engage, may serve as an electrical contact to which a conductor 39 may be suitably connected. The resilient means thus, in this instance, performs the double function of pressing the lamp positioning means into registry with the reflector and acting as an electrical contact means.

In view of the foregoing it will be apparent to those skilled in the art that the herein disclosed embodiment of my invention provides a new and improved lamp assembly, and accordingly accomplishes at least the principal object of my invention.

It also will be obvious to those skilled in the art that my invention may be embodied in other constructions wherein the means for positioning the lamp, and the means for holding it in position with the reflector, may assume a variety of forms, variously changed and modified within the spirit of the invention.

In general it will be clear to those skilled in the art that the features of my invention need not all be used in one embodiment such as the particular disclosed embodiment, and may be individually or collectively variously changed and modified, without departing from the spirit of the invention, or sacrificing the advantages thereof, and accordingly that the disclosure herein is illustrative only, and that my invention is not limited thereto.

I claim:

1. In combination: an incandescent electric lamp; a reflector for said lamp; positioning means for said lamp adapted to bring said lamp and reflector into register at a plurality of spaced points disposed about the axis of said lamp; said reflector at said points being without depressions receiving said positioning means to hold against rotation; and means mounted with said reflector, acting to press said positioning means and said reflector into register, at said points to position said lamp directly from said reflector.

2. In combination: an incandescent electric lamp; a reflector for said lamp; positioning means for said lamp adapted to bring said lamp and reflector into register at a plurality of spaced points disposed about the axis of said lamp; and means acting to press said positioning means and said reflector into register, at said points, to position said lamp directly from said reflector; said last named means having portions spaced from said axis and from each other, extending in the general direction of said axis, mounted with and disposed through said reflector.

3. In combination: an incandescent electric lamp; a reflector for said lamp; positioning means for said lamp adapted to bring said lamp and reflector into register at a plurality of spaced points disposed about the axis of said lamp; and means acting to press said positioning means and said reflector into register, at said points, to position said lamps directly from said reflector; said last named means having at least three portions spaced from said axis and from each other, extending in the general direction of said axis, mounted with and disposed through said reflector.

4. In combination: an incandescent electric lamp, having a base; a reflector for said lamp, provided with an aperture; said base having a body, and having positioning means extending laterally from said body and adapted to abut said reflector at a plurality of points spaced about the periphery of said aperture; said reflector at said points being without depressions receiving said positioning means to hold against rotation; and socket means for said lamp, mounted with said reflector, in alinement with said aperture, and engaging said base; said socket means comprising resilient means, and said resilient means acting to press said positioning means and said reflector into abutment at said points, to position said lamp directly from said reflector.

5. In combination: an incandescent electric lamp, having a base; a reflector for said lamp, provided with an aperture; said base having a body, and having positioning means extending laterally from said body and adapted to abut said reflector at a plurality of points spaced about the periphery of said aperture; and cage-like socket means for said lamp, mounted with said reflector, in alinement with said aperture, engaging said base and having parts of its cage-like structure disposed through said reflector; said socket means comprising resilient means, and said resilient means acting to press said positioning means and said reflector into abutment at said points, to position said lamp directly from said reflector.

6. In combination: an incandescent electric lamp, having a base; a reflector for said lamp, provided wtih an aperture; said base having a body, and having positioning means extending laterally from said body and adapted to abut said reflector at a plurality of points spaced about the periphery of said aperture; and cage-like socket means for said lamp, mounted with said reflector, in alinement with said aperture, engaging said base and having at least three parts of its cage-like structure disposed through said reflector; said socket means comprising resilient means, and said resilient means acting to press said positioning means and said reflector into abutment at said points, to position said lamp directly from said reflector.

7. In combination: an incandescent lamp; a reflector for said lamp; said lamp having positioning means adapted to register with said reflector at a plurality of spaced points disposed about the axis of said lamp; said reflector at said points being without depressions receiving said positioning means to hold against rotation; and means, detachably mounted with said reflector, for cooperation with said positioning means, to restrain movement of said lamp about its axis.

8. In combination: an incandescent lamp; a reflector for said lamp; said lamp having positioning means adapted to register with said reflector at a plurality of spaced points disposed about the axis of said lamp; said reflector at said points being without depressions receiving said positioning means to hold against rotation; means, detachably mounted with said reflector, for cooperation with said positioning means, to restrain movement of said lamp about its axis; and means, mounted with said restraining means, acting to press said positioning means and said reflector into register, at said points.

9. In combination: an incandescent lamp; a reflector for said lamp; said lamp having positioning means adapted to register with said reflector at a plurality of spaced points disposed about the axis of said lamp; and cage-like means mounted with said reflector, for cooperation with said positioning means, axially extending elements of said cage-like means acting to restrain movement of said lamp about its axis; said axially extending elements being disposed through said reflector.

10. In combination: an incandescent lamp; a reflector for said lamp; said lamp having positioning means adapted to register with said reflector at a plurality of spaced points disposed about the axis of said lamp; cage-like means mounted with said reflector, for cooperation with said positioning means, axially extending elements of said cage-like means acting to restrain movement of said lamp about its axis; said axially extending elements being disposed through said reflector; and means acting to press said positioning means and said reflector into register, at said points.

11. In combination: an incandescent lamp; a reflector for said lamp; said lamp having positioning means adapted to register with said reflector at a plurality of spaced points disposed about the axis of said lamp; cage-like means mounted with said reflector, for cooperation with said positioning means, axially extending elements of said cage-like means acting to restrain movement of said lamp about its axis; said axially extending elements being disposed through said reflector; and means, mounted with said restraining means, acting to press said positioning means and said reflector into register, at said points.

12. In combination: an incandescent lamp, having a base; a reflector for said lamp, provided with an aperture, in alinement with said base; said reflector being provided with a plurality of auxiliary apertures disposed about the axis of said base; said base having means adapted to position said lamp in a predetermined position; and means, having portions disposed through said auxiliary apertures, said means carrying resilient means acting to cause said positioning means to function.

13. In combination: an incandescent electric lamp, having a base; a reflector for said lamp, provided with an aperture, in alinement with said base; said reflector being provided with a plurality of auxiliary apertures disposed about the axis of said base; said base having positioning means adapted to register with said reflector at a plurality of spaced points disposed about the periphery of said base; and means having portions disposed through said auxiliary apertures, said means carrying resilient means acting to press said positioning means and said reflector into register, at said points, to position said lamp directly from said reflector.

14. In combination: an incandescent electric lamp, having a base; a reflector for said lamp, provided with an aperture, in alinement with said base; said reflector being provided with a plurality of auxiliary apertures disposed about the axis of said base; said base having means adapted to position said lamp in a predetermined position; and means, having portions disposed through said auxiliary apertures, for cooperation with said positioning means, to restrain movement of said lamp about its axis, said means carrying resilient means acting to cause said positioning means to function.

15. In combination: an incandescent electric lamp, having a base; a reflector for said lamp, provided with an aperture, in alinement with said base; said reflector being provided with a plurality of auxiliary apertures disposed about the axis of said base; said base having positioning means adapted to register with said reflector at a plurality of spaced points disposed about the periphery of said base; and means having portions disposed through said auxiliary apertures, for cooperation with said positioning means, to restrain movement of said lamp about its axis, said means carrying resilient means acting to press said positioning means and said reflector into register, at said points, to position said lamp directly from said reflector.

16. The combination with an incandescent electric lamp; of a concave reflector having a uniformly concave reflecting surface and a uniformly convex back; and spring means pressing the lamp base against the back of the reflector, wherein a socket is carried by this reflector that receives the lamp base and the spring means includes a coil spring carried by and bottomed in the socket, there being a bayonet seat for receiving a lateral projection provided upon the lamp base, this seat being jointly defined by said socket and reflector.

17. The combination with an incandescent electric lamp whose base is laterally extended; of a concave reflector formed with an opening therethrough, this opening being of an extent permitting passage of the lamp base, where laterally extended, from the interior to the back of the reflector, said reflector having a uniformly concave reflecting surface and a uniformly convex back; and spring means pressing the lamp base, where laterally extended, forwardly and against the back of the reflector, wherein a socket is carried by the reflector that receives the lamp base and the spring means includes a coil spring carried by and bottomed in the socket, there being a bayonet seat for receiving the lamp base, where laterally extended, this seat being jointly defined by said socket and reflector.

18. A shell adapted to receive a contact carrying member, said member being partially laterally extended, wherein the shell has a flaring portion at the contact carrying member receiving end thereof and positioned to engage the contact carrying member, where laterally extended, and guide it, where extended, into a recess formation in the shell.

19. The structure of claim 18 wherein the contact carrying member is in the form of a disc laterally extended by having three fingers distributed therearound and the shell has three recesses receiving said fingers.

20. The structure of claim 18 wherein the contact carrying member is in the form of a disc having three fingers distributed therearound and the shell has three recesses receiving said fingers and wherein the shell is provided with two flaring portions at the disc receiving end thereof to guide two of said fingers into the recesses corresponding thereto.

21. The combination with a socket; of a lamp base received in said socket; a reflector having an opening receiving said socket and lamp base therethrough; a bayonet pin on the lamp base; a bayonet seat jointly defined by the reflector and socket, said socket being carried by the reflector; and a spring carried by the socket and pressing the bayonet pin into its seat.

22. A lamp and reflector unit, comprising: an incandescent lamp; a reflector for said lamp; said lamp having positioning means to register said lamp with said reflector at a plurality of points spaced about the axis of the lamp; and means, carried by said reflector, quickly-detachable from said reflector, comprising portions cooperating with said positioning means to restrain movement of said lamp about its axis, extending through said reflector, and detachably supporting said means from said reflector.

23. A lamp and reflector unit, comprising: an incandescent lamp; a reflector for said lamp; said lamp having positioning means to register said lamp with said reflector at a plurality of points spaced about the axis of the lamp; means, carried by said reflector, quickly-detachable from said reflector, comprising portions cooperating with said positioning means to restrain movement of said lamp about its axis, extending through said reflector, and detachably supporting said means from said reflector; and means, mounted with said restraining means, acting to press said positioning means and said reflector into register at said points.

24. In combination: an incandescent electric lamp, having a base; a reflector for said lamp; means for connecting said lamp to said reflector, including a plurality of bayonet connections; one part of each said bayonet connection extending laterally from said base and providing positioning means for said lamp adapted to bring said lamp and reflector into register at a plurality of spaced points disposed about the axis of said base; said reflector at said points being without depressions receiving said positioning means to hold against rotation; and means acting to press said positioning means into said register with said reflector.

HARRY A. DOUGLAS.